United States Patent

Parilla

[15] 3,692,258

[45] Sept. 19, 1972

[54] MISSILE CONFIGURATIONS, CONTROLS AND UTILIZATION TECHNIQUES

[72] Inventor: Arthur R. Parilla, P.O. Box 127, Mountain Lakes, N.J. 07046

[22] Filed: Oct. 3, 1968

[21] Appl. No.: 767,583

Related U.S. Application Data

[62] Division of Ser. No. 607,068, Jan. 3, 1967, Pat. No. 3,489,373.

[52] U.S. Cl. .....................244/3.21, 60/230, 60/242
[51] Int. Cl. .........F42b 15/18, F02k 1/08, F02k 1/16
[58] Field of Search.......................244/1, 3.21, 3.22

[56] References Cited

UNITED STATES PATENTS 2,584,127  2/1952  Harcum et al. ..............244/3.2
3,210,937  10/1965  Perry, Jr. ................60/35.6 X

*Primary Examiner*—Benjamin A. Borchelt
*Assistant Examiner*—Thomas H. Webb
*Attorney*—Morgan, Finnegan, Durham and Pine

[57] ABSTRACT

Missile configurations with engine and propellant control systems are the subject of this application together with weapons and navigational techniques employing same. Reaction engine control systems employing relatively moveable plug-cowl configurations with associated control systems are described herein for providing control of thrust direction and magnitude, engine operating conditions, missile kinematics, and other parameters of liquid and solid propellant rockets.

31 Claims, 12 Drawing Figures

INVENTOR.
ARTHUR R. PARILLA

ATTORNEYS

INVENTOR.
ARTHUR R. PARILLA

ATTORNEYS

PATENTED SEP 19 1972 3,692,258

INVENTOR.
ARTHUR R. PARILLA

Morgan, Finnegan, Durham & Pine

ATTORNEYS

MISSILE CONFIGURATIONS, CONTROLS AND UTILIZATION TECHNIQUES

RELATED PATENTS AND APPLICATIONS

This application is a division of applicant's prior copending application, Ser. No. 607,068, filed Jan. 3, 1967 for Missile Configurations, Controls and Utilization Techniques now U.S. Pat. No. 3,489,373 which is a continuation-in-part of applicant's prior copending application, Ser. No. 302,222, filed June 14, 1963 and now abandoned, for "Aircraft Missiles, Missile Weapons System and Space Craft." Another division of applicant's prior copending application, Ser. No. 607,068 copending with this application is application, Ser. No. 784,818, filed Dec. 18, 1968, for Solid Propellant Rocket Engine Control And Missile Configurations.

The latter is in turn a copending division of application, Ser. No. 701,571, filed Dec. 9, 1957 and now U.S. Pat. No. 3,094,072, granted June 18, 1963. An additional application of the applicant, Ser. No. 860,304, is also related to the instant application, being another continuation-in-part of Ser. No. 701,571, and now U.S. Pat. No. 3,151,446.

This invention relates to control systems and operating techniques for missiles having engines capable of controllable thrust magnitude and direction. Examples of such engines are found in applicant's above cited patents.

Described herein are apparatus and techniques for controlling various flight and engine parameters of such missiles to provide improved accuracy, flexibility and reliability of operation. Instrumentalities and techniques are disclosed for controlling thrust magnitude and direction, missile velocity, acceleration and attitude, engine efficiency and thrust termination over a wide range of environmental kinematic and aerodynamic conditions.

According to the invention new concepts in antispace missile weapons systems are provided. Defensive missiles are described for intercepting intercontinental ballistic missiles, satellites, or other space objects at extreme altitudes to provide defense over large areas. In order to insure accuracy of interception, the defensive missile according to the invention is capable of hovering flight at zero velocity in space for finite time periods while the guidance system seeks and locks onto the target, followed by a collision course in any direction to the target upon command of the guidance system. The defensive missile is capable of maneuverability in space in any direction in any of the three principal planes, covering a range of several hundred miles from its position during hovering flight. This flexibility may be provided with either solid or liquid propellant rocket engines. Applicant's aforementioned U.S. Pat. No. 3,489,373 contains a detailed description of the implementation of the control systems and methods of the present application to achieve hovering flight and antispace missile weapons systems.

To achieve the foregoing, novel control system arrangements are provided in which various flight parameters such as acceleration, velocity, incremental velocities, or their combination, may be maintained constant independent of variable drag due to variable altitude, or other environmental conditions, and independent of variations in missile mass, engine performance due to manufacturing tolerances, and other variables.

These new operational and control techniques permit improved anti-ballistic missile weapons systems for local defense against ballistic missile attack; improved ground-to-air defense; and improved long range air-to-surface missiles of minimum weight and maximum reliability.

BACKGROUND

Most jet engines in which thrust is developed by the discharge of a compressible fluid at supersonic velocities, such as rocket engines, ram-jet engines or turbo-jet engines, or combinations of these such as the ram-jet ducted-rocket, or the turbo-rocket, usually employ nozzles of the converging-diverging type, sometimes called a DeLaval or venturi nozzle, characterized by a fixed geometry having a constant throat area and constant ratio of area expansion in the diverging portion.

It is well recognized that a variable throat area nozzle improves the flexibility of engine operation over a broader range; thrust may be varied in magnitude as the throat area is increased or decreased; the combustion characteristics and internal gas dynamics upstream of the throat being greatly affected by the magnitude of the throat area.

Engine efficiency is also improved by a variable nozzle expansion ratio, resulting in increased thrust or engine efficiency. The desired area expansion ratio is a function of pressure ratio or ratio of internal chamber pressure at nozzle inlet to ambient atmospheric pressure at nozzle discharge. Even in engines which operate at substantially constant chamber pressure, as in liquid rocket engines, the pressure ratio increases with altitude. If the nozzle is designed for sea-level conditions, under-expansion and loss of efficiency occurs at higher altitudes. If it is designed for a high altitude condition, over-expansion occurs at sea-level resulting in a loss of thrust during the critical take-off condition.

Most engines employing fixed geometry nozzles, are designed to operate at fixed thrust levels. While some degree of throttleability is possible in liquid propellant rocket engines and in air breathing engines by means of control valves which reduce mass flow rate of propellant or fuel to the engine, this range is limited. Combustion chamber pressure reduces at the lower mass flow rates with a constant nozzle throat area, further throttling being limited by combustion instability or flame-out at the lower chamber pressures. The range of throttleability may therefore be increased by a variable throat area which maintains chamber pressure within operable limits even at reduced thrust.

This lack of flexibility, or throttleability is even greater in solid propellant rocket engines, for once ignition occurs, further control over thrust is impossible in conventional engines. The thrust time characteristic is dependent upon the internal ballistics, i.e., the propellant burning rate, propellant burning surface, propellant density and nozzle throat area, the ratio of propellant burning surface to nozzle throat area being an important parameter, denoted by the symbol K. Since these quantities are all fixed in the design stage, further control during flight is not possible. A variable nozzle throat area controllable during flight can, then, by varying K exert an important control over thrust.

In a similar manner, control over thrust termination is a serious problem with solid propellant engines. While this is accomplished readily in liquid propellant rocket engines and in air breathing engines, simply by valve closure, conventional solid propellant rocket engines require special provisions to provide controlled and reproducible thrust termination, which is critical for accurate control of ballistic missiles. One such method is by ejection of a nozzle insert, the abrupt increase in nozzle throat area causing a rapid pressure drop which extinguishes combustion. It is found that undesirable thrust peaks occur with this method as a result of the simultaneous product of high chamber pressure and large throat area at the moment ejection occurs. This is objectionable since the high accelerations thus transmitted to the missile may damage sensitive components.

Alternate means for thrust termination provide auxiliary nozzles or orifices which discharge combustion gases in a forward direction when burst discs are energized, thus neutralizing the thrust from the primary nozzles discharging rearwardly. This creates a packaging problem for disposition of the gases from the missile, and for loading propellant, while the additional components add weight and complexity to the system. Also, neither solution permits re-starts for those applications where intermittent thrust may be desired in a controllable solid propellant rocket engine.

In applying propulsion systems to guided missiles, it is frequently desired to vary not only the magnitude of thrust, but also its direction. Means for thrust vector directional control can provide missile stability and maneuverability during launch and during flight. Substantial reduction in cost, weight and aerodynamic drag can be achieved by eliminating large aerodynamic fins, and complex fittings required for fin attachment. This, then, reduces storage space and improves accuracy by reducing dispersion due to aerodynamic gusts.

Present methods for thrust vector control generally require subsidiary means attached to or near the nozzle exit so as to deflect the jet stream when actuated. Examples are jet vanes, as used on the German V-2 rocket, and more recently, jetavators.

Jet vanes are submerged in the jet stream issuing from the nozzle, rotation of the vane causing deflection of the jet stream thereby varying the direction of thrust. Since such vanes are constantly immersed in the jet stream, they cause drag losses reducing net thrust even when control forces are not required. This objection is eliminated in jetavators in which a circular ring mounted on gimbal supports surrounds the jet stream at the nozzle exit. The ring is normally free of the jet stream, but dips into it when actuated to deflect the jet and hence the resultant direction of thrust. Obviously, the jetavator must be of larger diameter than the nozzle exit, thereby limiting expansion ratio, or requiring diameters larger than maximum diameter of rocket case, in which event, aerodynamic drag replaces drag due to immersion in jet stream. Large deflection angles are required to be effective, since only a portion of the ring intersects the jet stream, the opposite diameter moving away from it. In both jet vanes and jetavators, additional components are required which must be constructed of high temperature resistant materials, and which add weight, complexity and cost, and reduce reliability.

An alternate method of thrust vector control is used with liquid propellant rocket engines in which the entire thrust chamber assembly is pivotally mounted on gimbal rings to provide freedom of motion in two perpendicular planes. Obviously, the gimbal ring and mounting provisions must be designed to transmit the full thrust loads, adding weight. Also, control forces must be large to provide the desired high frequency of response. A further problem exists because of the need for flexible feed lines for delivering propellant to the thrust chamber. As engine size increases, these become large diameter pipes with the requirement for flexibility becoming increasingly difficult. This method is wholly impractical for solid propellant rocket engines wherein the entire mass of propellant is stored within the thrust chamber, resulting in a very high moment of inertia.

Other problems associated with solid propellant rocket engines which may be alleviated by the variable nozzle throat area technique described in the aforementioned patents and in further detail hereinafter include: (1) the temperature sensitivity of the propellant to ambient temperature of the grain before firing; (2) erosive burning, whereby burning rate increases upon ignition because of high velocity gases passing over propellant burning surfaces; (3) variation of propellant burning surface during burning, including effects of small cracks in propellant; and (4) sliver formation, or small sections of unburnt propellant remaining after burnout.

Items (1), (2) and (3) result in peak chamber pressures, increasing design requirements, thereby adding weight, while (4) adds weight while contributing nothing to performance.

In addition to the foregoing, a major problem which is aggravated by the limitations of present propulsion systems, is the successful interception of ballistic missiles, satellites or other objects travelling at great velocities through or from outer space. The split second precision required to insure collision and mutual destruction between two bodies travelling at great velocities is enormous.

These, and other problems hereinafter described, offer serious limitations to performance of aircraft, missiles, missile weapons systems, and space ships.

It is, therefore, the purpose of this invention to advance the state of the art in missile configuration, control and utilization to overcome the aforementioned limitations and to accomplish, in addition to those objectives recited in applicant's U.S. Pat. Nos. 3,094,072 and 3,489,373 the following specific objectives:

To provide mechanical or fluid spring control arrangements for automatically controlling the variable throat area of jet engine nozzles.

To provide fluid, and/or electrically operated control systems and actuators for controlling the variable throat area of jet engine nozzles.

To provide improved ballistic missiles the flight trajectory of which is related to engine performance so as to provide optimum nozzle thrust coefficient relationships as a function of altitude by automatically varying the nozzle area expansion ratio.

To provide a missile system capable of maintaining a constant acceleration during flight independent of variable drag at variable altitude, variable mass, or other environmental condition.

To provide a missile system capable of increasing its own velocity by a fixed increment independent of variable drag at variable altitude, variable mass or other environmental condition.

To provide a missile system capable of maintaining a constant flight velocity independent of variable drag at variable altitude, variable mass, or other environmental condition.

To provide a missile system capable of maintaining constant acceleration followed by constant velocity, or vice versa, and repetitively in any prescribed manner as desired, independent of variable drag, variable mass, or other environmental condition.

To provide an anti-missile missile system capable of hovering flight while the guidance system seeks and locks onto the invading enemy target, followed by high maneuverability of the defensive missile in any direction as it accelerates on a collision course for target interception.

To provide a simple mechanical analog computer as part of the guidance and control system of an anti-missile missile for directing the defensive missile from its hovering position to the desired collision course for target interception.

To improve the throttleability of liquid propellant rocket engines by maintaining thrust chamber pressure at reduced propellant flow rates automatically by means of a novel variable area nozzle control system.

To provide new liquid propellant booster rockets incorporating new concepts in thrust chamber control, expellant bag design for gas pressurization of propellant tanks, and improved reproducibility in pressurization by gas generators.

To provide greater safety by rendering missiles non-propulsive during storage in the event of accidental ignition.

To protect rocket casings against destructive failure in the event of moderate grain cracking by use of a variable area nozzle acting as a pressure relief valve.

Serving to illustrate exemplary embodiments of the invention are the drawings of which:

A. GENERAL FEATURES OF VARIABLE COWL-PLUG CONFIGURATION

1. Control of Pressure, Thrust Magnitude, and Related Factors

In applicant's previously cited prior copending applications and patents, techniques are illustrated for varying the throat area and other geometric parameters of nozzles employed in thrust producing devices. Among the illustrative examples are a number of embodiments for varying the throat area and stream orientation in rocket engine nozzles to achieve variations in expansion ratio, chamber pressure, pressure ratio, propellant specific impulse, thrust magnitude, thrust direction, and related parameters. A brief review of the foregoing will serve as an aid to understanding the invention.

Figure 1:
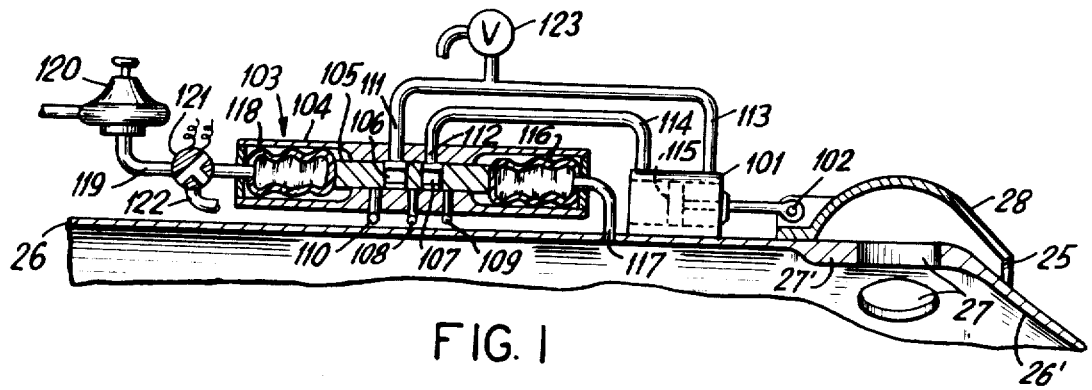
FIG. 1 is a fragmentary elevational view, partially diagrammatic, and partially sectional, of a hydraulic missile control system.

FIG. 1 of U.S. Pat. No. 3,489,373 illustrates the implementation of these techniques in a plug-type rocket engine nozzle. Reference may be made to U.S. Pat. No. 3,094,072 for further description of its structure and operation.

In the nozzle of FIG. 1, the resultant pressure forces acting on the cowl 28 are transmitted by the rod 54, adjustable nut, 58, and compression spring, 57, supported by the brackets 55 and 56 mounted on the case 26.

The control forces to position the cowl may be supplied in any desired manner. The simple mechanical springs in FIG. 1 may be replaced by electrical, hydraulic or pneumatic actuators, with signals from the guidance or control system to vary the nozzle position in any prescribed manner, as described hereinafter.

2. Thrust Termination

When adjusted by any of these means, the throat area may be increased continuously, with a continuous decrease in chamber pressure, thereby achieving thrust termination while avoiding the abrupt discontinuity which occurs with other techniques such as nozzle insert ejection. In this manner, thrust decay can be reproducibly controlled simply by extending the cowl 28 so as to increase the throat area to many times its normal design value. With propellant properties which permit continued burning at low ambient atmospheric pressures, the cowl may again be retracted until, at super-critical pressure ratios, the thermal energy of the gases is again converted into kinetic energy of the jet stream, with high velocities directed aft, again rendering the unit propulsive.

The above system also has the advantage that precision control over both missile velocity and attitude may be provided by operating at reduced thrust levels, with vector control, as described more fully hereinafter, available before thrust termination. Other means for thrust termination are described in the above-noted U.S. Pat. No. 3,094,072 and illustrated in FIG. 2 of the aforementioned U.S. Pat. No. 3,489,373, where ring 52 may be released by destruction of the explosive bolts 50.

3. Thrust Vector Direction Control

Figure 2:
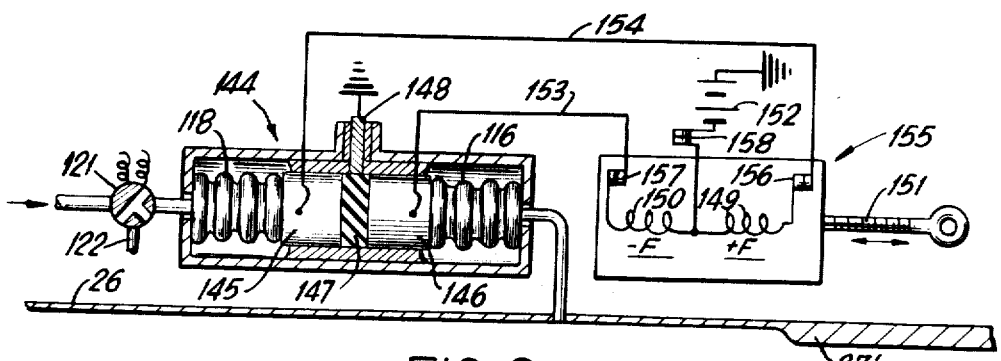
FIG. 2 is a view corresponding to FIG. 1, but employing an electrical missile control system.

In addition to thrust magnitude control and termination, FIG. 2 of U.S. Pat. No. 3,489,373 also illustrates means for controlling the direction of the thrust vector. As illustrated, the means involve mechanisms, e.g., linear actuators 64, for causing angular motion of the cowl about a transverse axis relative to the cylinder 26 to deflect the stream. Further description is found in applicant's U.S. Pat. No. 3,094,072.

Figure 3:
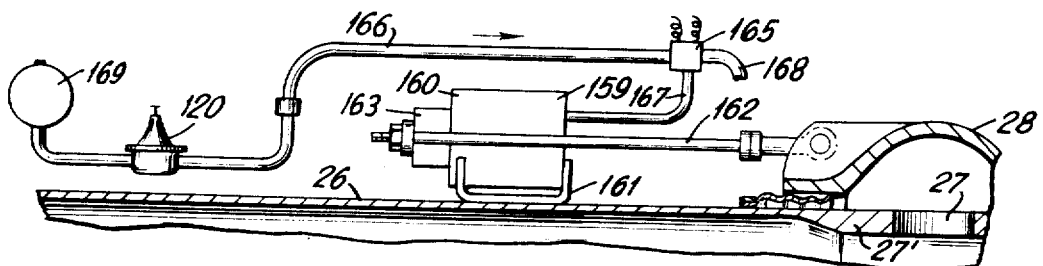
FIG. 3 is a fragmentary elevational view, partially diagrammatic and partially sectional, of a control system employing fluid spring means.

An alternate method for providing both translatory and oscillatory motion of the cowl may be provided without gimbal rings by use of four actuators 203 mounted 90° apart, as shown in FIG. 3 of the U.S. Pat. No. 3,489,373 and described in greater detail in the U.S. Pat. No. 3,094,072.

Figure 4:
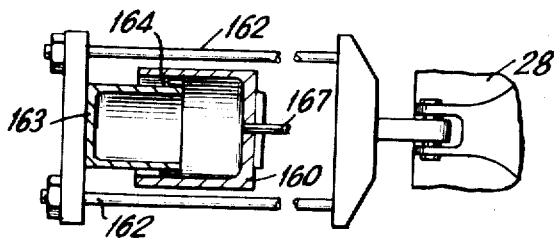
FIG. 4 is a sectional detail view of the variable fluid springs of the system of FIG. 3.

4. Combined Variable Area, Thrust Vector Control and Thrust Termination with Internal Supersonic Expansion The improvements shown herein are not necessarily limited to nozzles with external expansion. The control mechanisms may be employed where variable area, thrust vector control and thrust termination are combined within a nozzle employing only internal expansion. This is shown in FIG. 4 of the U.S. Pat. No. 3,489,373 and described in greater detail in said U.S. Pat. No. 3,094,072.

B. PARAMETER REGULATING TECHNIQUES

A variable throat area nozzle offers important mechanical solution to many problems in solid propellant rocket engines. It makes possible substantial reduction in case weight beyond the use of higher strength materials by automatically maintaining constant chamber pressure independent of the temperature sensitivity of the propellant, and of the progressivity or regressivity of the propellant grain.

It also makes possible a controllable solid propellant rocket engine whose thrust may be varied at will, providing flexibility in operation which even surpasses throttleability of liquid propellant rocket engines.

Figure 5:
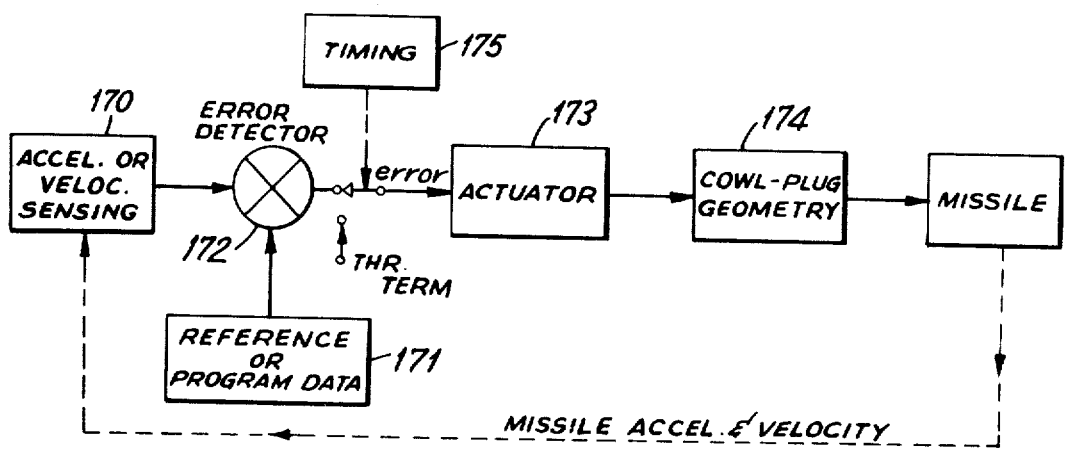
FIG. 5 is a block diagram illustrating a control system for controlling missile kinematics.

FIG. 5 of the U.S. Pat. No. 3,489,373 illustrates the application of the variable nozzle principles to a solid propellant rocket engine, which is described in greater detail in the U.S. Pat. No. 3,094,072.

It may be seen that when the internal pressure increases (due to any of several reasons as described below), the higher pressure force causes further compression of the spring 57, opening the cowl to a larger throat area. Similarly, when the internal pressure decreases, the lower pressure force causes the spring 57 to extend, thereby retracting the cowl, resulting in a smaller throat area. The throat area thus increases automatically with increasing chamber pressure.

Figure 6:
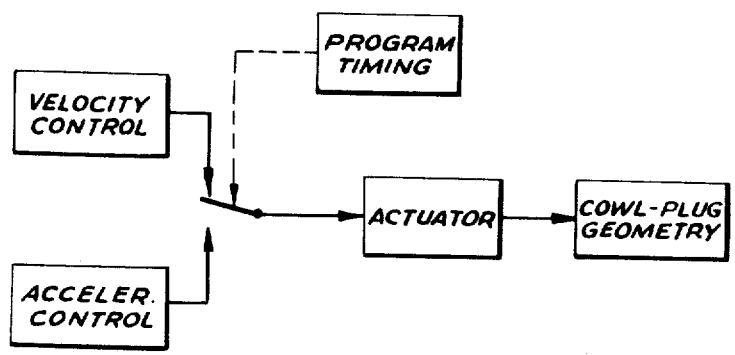
FIG. 6 is a block diagram illustrating missile velocity and acceleration control modes.

Other parameter regulating techniques are described in the aforesaid patent and include (1) constant pressure operation independent of ambient temperature (see FIG. 6 of the U.S. Pat. No. 3,439,373) (2) constant pressure operation independent of grain regressivity and progressivity, (3) reduced thrust variation, and (4) adjustable thrust level.

PARAMETER REGULATING TECHNIQUES WITH EXTERNAL PROGRAMMABLE CONTROL

The use of a variable area nozzle makes possible a controllable solid propellant rocket engine in which the thrust may be varied in magnitude at will throughout flight. Thrust variation may be obtained by varying the nozzle cowl position and, hence, throat area responsive to any type control system.

1. General Control Techniques

The mechanical springs for positioning the cowl as shown in FIG. 5 of the U.S. Pat. No. 3,489,373 may be replaced by servo-controls, either fluid or electrically actuated, illustrated in FIGS. 1 and 2 respectively.

In the systems shown in FIGS. 1 and 2, the difference between rocket chamber pressure and a control pressure from any source is used as the input signal to increase or decrease thrust.

A system using fluid actuation is illustrated in FIG. 1, while FIG. 2 illustrates a system with electrical actuators. Further description of these systems and their uses in controlling thrust and thrust termination are found in the U.S. Pat. No. 3,094,072.

A fluid spring installation is illustrated in FIGS. 3 and 4 in which the fluid spring assembly 159 replaces the mechanical spring 57 and associated parts earlier described. As described in the U.S. Pat. No. 3,094,072, this arrangement may be utilized for non-propulsive storage, thrust termination, and booster disposal.

2. Control Techniques for Regulating Acceleration and Velocity

As noted above, the adjustable cowl-plug configuration lends itself with considerable facility to control over various missile parameters by way of self regulation and in response to external controls.

Control of thrust magnitude, thrust direction, chamber pressure, thrust termination and related conditions such as those associated with non-propulsive storage and booster disposal, has been described hereinbefore.

These techniques are also applicable to the control of other parameters dealing with missile kinematics.

The accuracy and, hence, reliability with which missiles reach their targets may be greatly improved if the normal variations from round to round could be eliminated. These variations include missile weight, propellant loading, and engine performance due to manufacturing tolerances; environmental conditions, such as ambient temperatures and altitudes; and other factors which vary the missile weight, drag and thrust relationships during flight.

As one example, in the case of air-to-air or air-to-surface missiles, the drag may vary considerably dependent upon the altitude of the carrier plane from which the missile is launched. Thus, the time to reach the target could vary due to cumulative variations. There are, of course, other examples such as an Anti-ICBM missile where great accuracy is required to insure successful interception of the attacking ICBM.

If the thrust of the variable nozzle rocket engine is controlled responsive directly to some slight parameter, such as acceleration, velocity, or both, its accuracy could be greatly improved, cancelling normal variations such as those set forth above.

In applicant's above cited U.S. Pat. No. 3,094,072 systems are described for controlling the missile parameters acceleration and velocity.

A schematic indication of these systems for the case of acceleration control is illustrated in FIG. 5. An accelerometer 170 is oriented to sense missile acceleration. Any appropriate acceleration measuring instrument may be employed, two types mentioned in said patent being mass-spring units with either mechanical or fluid springs.

Desired acceleration, either a constant reference value, or programmable values for adjustable control during flight, is set into the system by means 171 which may be for example arrangements which deflect the mechanical spring or pressurize the fluid spring.

The accelerometer output, indicative of actual missile acceleration is coupled to an error detector 172 along with the desired acceleration data.

The error detector may be of any known configuration and, as described in the above-cited U.S. Pat. No. 3,094,072, can take the form of a differentially actuated electrical switch arm or a differentially actuated fluid valve spool.

Any discrepancy between actual and desired acceleration is reflected in an error indication manifested as an electrical or hydraulic signal. This signal is fed to the actuator 173 which causes a corrective change in the cowl-plug configuration.

When the correction is completed, actual and desired missile acceleration are brought into conformity.

The period of controlled acceleration may be adjusted by suitable timing means such as 175 which are adapted to disable the servo controlled acceleration mode.

For example, missile acceleration can be maintained for a controlled time interval and then terminated by timing means 175 thus providing a controlled velocity increment in missile performance. By regulating acceleration as hereinbefore described during the time interval, a desired terminal velocity is thereby achieved. The timing device can at this time then program a thrust termination into the power actuator.

Velocity control may be accomplished by substituting velocity sensing means in the system of FIG. 5 thus providing an alternate method for establishing desired missile velocity. Any velocity responsive means may be used, such as those which sense the ratio of dynamic to static pressure when the missile operates within the atmosphere or any other means.

Joint control is also obtainable in the manner shown in FIG. 6 by timed switching of the cowl-plug actuator between a velocity control mode and an acceleration control mode. The timing may be programmed with local devices such as motor-operated switches or from the guidance system.

3. Angle of Attack Vector Control System

In general, the attitude sensing equipment in the missile, with or without external commands, supplies the required data to the thrust vector control system hereinbefore described. In certain cases, such as one hereinafter described, it is desired that the missile follow a course angle $\theta$ while maintaining a missile heading $\beta$ which is different from the course angle. Under these conditions, the missile will fly at an angle of attack ($\alpha=\theta-\beta$), it being noted that outside the atmosphere lift and drag are negligible and therefore not relevant in missile movement.

Figure 7:
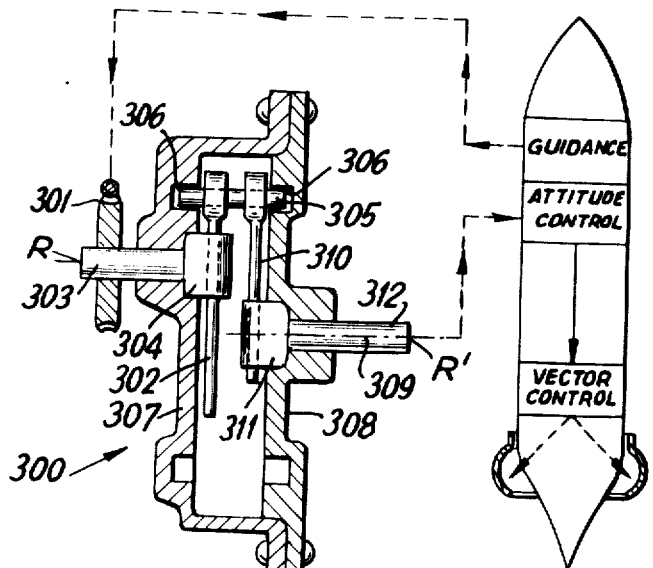
FIG. 7 is a partially diagrammatic, partially sectional view of an analog computer employed in the direction control system of a missile.
Figure 8:
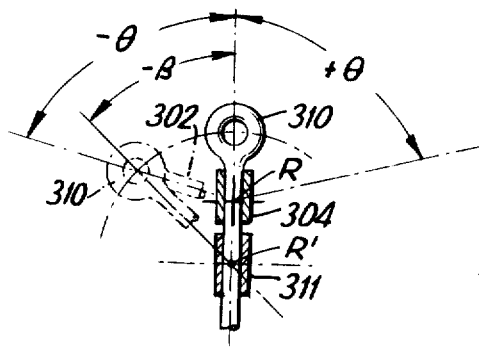
FIG. 8 is a partially diagrammatic, partially sectional fragmentary view of a portion of the computer of FIG. 7.

A simple mechanical analog computer, shown in FIGS. 7 and 8, may be used to quickly determine the proper missile heading, $\beta$, for any desired flight direction, $\theta$.

The computer assembly, 300, of FIGS. 7 and 8 is designed so that an input signal of angle $\theta$ produces an output signal equal to angle $\beta$.

As shown in FIG. 7, the worm and wheel, 301, rotates the driver arm 302 through the angle $\theta$ by means of the shaft 303 containing a socket 304 in which the driver arm 302 is free to reciprocate. The driver arm rotates the pin 305 within the grooves 306 in the housings 307 and 308, the grooves being concentric with the computer centerline 309. The driver arm 302 through pin 305 also rotates the driven arm 310 which is mounted in the socket 311, integral with the shaft 312, located on the centerline 309. Thus, as shown in FIG. 8, rotation of the input shaft 303 through angle $\theta$, causes rotation of the output shaft 312 through the angle $\beta$. The guidance system then determines only the desired flight direction, $\theta$, the analog computer then supplying the corresponding missile heading angle, $\beta$, to the vector control system.

The driver and driven arms 302 and 310 are both in the vertical plane during climb and while hovering. When the guidance system signals a desired flight path of $+\theta°$, ($+$ plus being in the clockwise direction) the driver shaft 303 rotates the arm 305 through $-\theta°$, (counterclockwise), the driven arm 310 and output shaft 312 rotating through $-\beta°$. Rotation of shaft 312 introduces a bias, or "error" in the control system which maintains the missile centerline coincident with the vertical reference axis through the Earth's center. The missile is thus rotated through the angle $\beta$, or until the driven arm 310 again coincides with the vertical reference axis, O-A. The missile will now have the desired heading, $\beta$, to accomplish the flight path $\theta$. The new missile heading will be maintained constant with reference to the vertical reference axis by the same nozzle vector control system as in vertical flight.

4. Generalized Control Techniques

Figure 9:
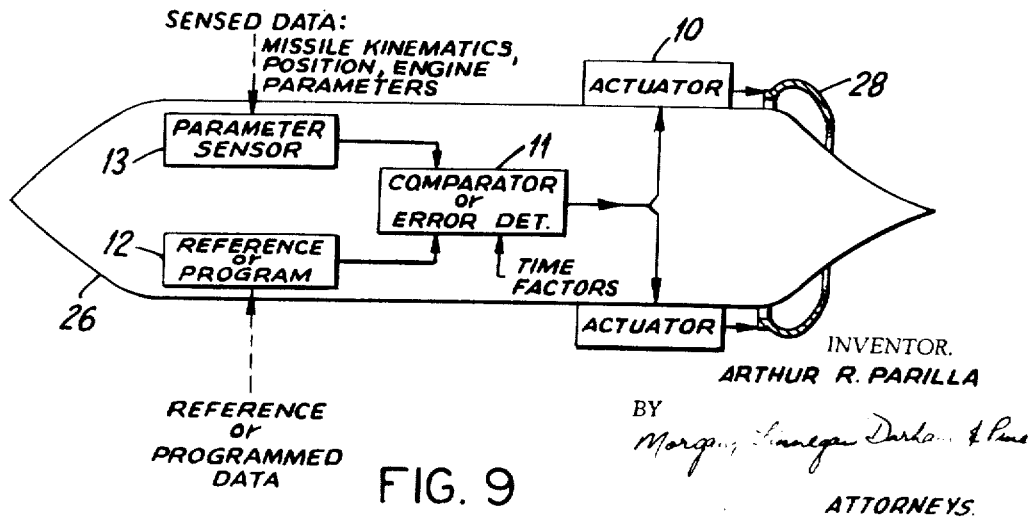
FIG. 9 is a diagrammatic view of a general control arrangement for controlling missile performance.

FIG. 9 graphically summarizes and generalizes the control techniques hereinbefore described for controlling missile behavior. In the illustration, the missile is identified at 26 and includes adjustable cowl 28. The cowl is uni-directionally moved for the control of thrust magnitude and differentially moved for thrust vector direction control. Movement is accomplished by the actuators 10 which may be any of the types hereinbefore mentioned. The actuators 10 are driven by the error or correction signal derived from the comparator 11 which receives in turn two inputs. One input comprises a signal representing the particular parameter which is being sensed, this being derived from the parameter sensor 13. The other input is a command signal or signal indicative of the reference condition, derived from control means 12. If these signals do not correspond, indicating the actual condition differs from the desired condition, an error or correction signal is developed. This error signal operates the actuators 10 to bring the actual condition into correspondence with the desired or commanded condition.

Maintenance of the missile in a desired angular orientation relative to a reference line such as the vertical, was described hereinbefore. In such an application, the control device 12 is supplied with the desired angular orientation data, e.g., the angle $\theta=\theta_1$. With appropriate translation, this signal is fed to the comparator 11 which compares this signal with the signal from sensor 13 which indicates the actual angular orientation of the missile. The sensor may be a vertical seeking gyroscope, or a stabilized platform or the like. If the command angle is different from the actual angle sensed by the sensor, an error or correction signal is generated in the comparator 11 and fed to the actuators 10. In this application, the actuators are differentially driven to produce cowl rotation thereby causing the thrust vector direction to change. In response, the missile commences to change heading and when the actual heading corresponds with the desired heading, the error signal disappears and the thrust vector control system is accordingly deenergized after the usual stabilizing transient. For angle-of-attack types of control, the input device 12 may include the $\theta$ to $\beta$ converter shown in FIG. 7.

As noted hereinbefore and described more fully hereinafter, the command signal or reference level may be programmed into the system initially or may be received from a remote point during flight. For example, desired thrust levels may be preprogrammed in the control system with timing means employed to command the desired levels in accordance with the program. In the missile weapon system described hereinafter, desired or commanded missile conditions are received in one mode from a remote point.

FIG. 9 is also illustrative of the examples hereinbefore given of means for automatically controlling engine performance factors, e.g., chamber pressure. In these cases, the sensed parameter is chamber pressure. The command or reference level of chamber pressure is compared with the sensed, i.e., actual chamber pressure, the latter being transduced with the aid of the interior cowl surface. Any unbalance causes the actuation of the cowl 28, the unbalance constituting the error signal.

In like manner, the control systems of FIG. 1 and 2 are illustrated generally by FIG. 9. The bellows 116, serving as the chamber pressure sensor, and bellows 118 serving to supply the system with the commanded or desired chamber pressure are represented by 13 and 12 in FIG. 9. The comparator of that figure comprises the control valve 103 or the switch 144, each of which develops an error signal which is fed to the respective actuator 101 and 155 in FIGS. 1 and 2, and 10 in FIG. 9.

In the case of missile kinematics, the control system reflects arrangements such as those shown in FIGS. 5 and 6. The accelerometer mass or velocity sensing system, represented by parameter sensor 13, supplies one input to the comparator 11 of FIG. 9. The command or reference level is established as described hereinbefore, and is represented at 12. An error or correction signal from the comparator 11 drives the actuators.

From the foregoing, it may be seen that complete control over missile position, kinematics and engine parameters is attainable.

D. APPLICATIONS TO OTHER NOZZLE CONFIGURATIONS

The control techniques hereinbefore described may also be utilized with other nozzle types such as that shown in applicant's above-cited U.S. Pat. Nos. 3,151,446 and 3,094,072.

E. APPLICATIONS TO LIQUID PROPELLANT ROCKET ENGINES

Emphasis has been placed upon improvement in solid propellant rocket engines because the flexibility of operation described herein represents a major advance in the state of the art with respect to conventional solid propellant rocket engines.

Similar improvements may be made in liquid propellant rocket engines as well. The use of variable throat area and variable expansion ratio nozzles by application of the principles herein described also permits greater flexibility in operation compared to conventional liquid propellant rocket engines.

Important differences exist in the application of the variable throat area nozzle to the two types of rocket engines. In the solid propellant rocket engine, all controls are applied directly to the variable area nozzle, the mass flow rate being a dependent variable which automatically increases or decreases in response to changes in throat area through the influence of chamber pressure on burning rate for a given propellant grain.

In the liquid propellant rocket engine, the controls may be applied directly to the propellant feed system controlling the mass flow rate to the thrust chamber, the nozzle throat area becoming the dependent variable which automatically increases or decreases responsive to change in the propellant mass flow rate.

Figure 10:
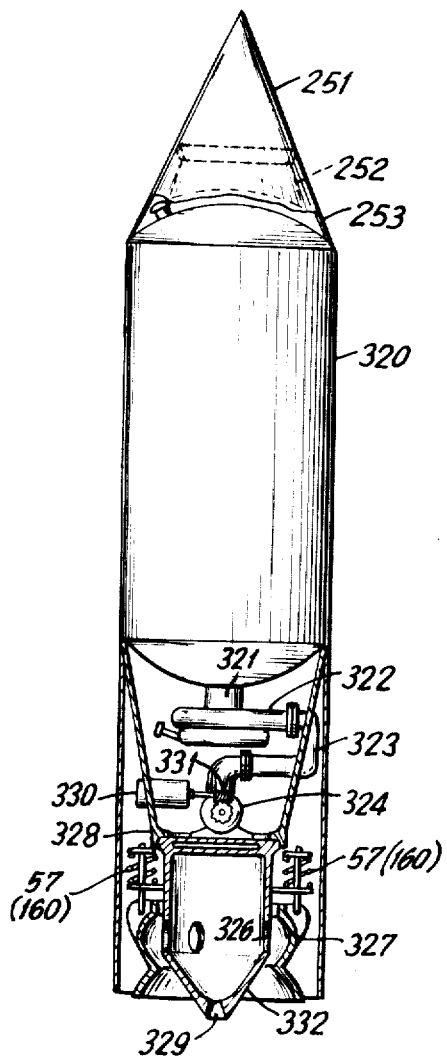
FIG. 10 is an elevational view, partially in section, of a liquid propellant rocket and control system therefor.

This system is illustrated in FIG. 10 which shows a typical missile powered by a liquid propellant rocket engine incorporating these new features. For simplicity a liquid monopropellant system is illustrated, with an uncooled thrust chamber. Extension of the design to provide for the usual bi-propellant system with a regeneratively cooled thrust chamber would follow normal conventional practice to a great degree.

In FIG. 10, 251 is the warhead, and 252 is a guidance system supported by the airframe 253. Propellant tank 320 contains a liquid monopropellant which flows through the outlet 321 to the turbo-pump assembly 322, and is discharged at high pressure through the rigid tubing 323 to a regulating valve 324 mounted on the forward end of the thrust chamber assembly 325. The latter is of novel design having an integral plug 332 at its aft end and contains radial ports 326 enclosed by a flexibly mounted cowl 327 attached to the chamber by means of flexible connection such as the bellows of FIGS. 2–5 of applicant's U.S. Pat. No. 3,489,373 or a flexible seal, which is insulated as shown in these figures. The cowl may be positioned by mechanical springs 57 as hereinbefore described, or by fluid springs, such as 160 of FIGS. 3 and 4.

The thrust chamber is rigidly mounted to the thrust structure 328, eliminating the heavy gimbal structure and flexible feed lines otherwise needed to oscillate the complete thrust chamber for vector control. The latter is achieved instead by rotation of cowl 327 as shown and described hereinbefore.

A small conventional nozzle 329 is formed at the apex of the plug surface as an additional safety device to prevent accumulation of unburnt propellant during the starting transient as ignition occurs, the chamber being self-draining.

Variable thrust is controlled by the actuator 330 which operates the worm-gear mechanism 331 to vary the mass flow rate through the regulating valve 324, a butterfly valve being the typical means for varying the flow rate. The actuator 330 may be a rotary actuator driving the worm-gear, or may be replaced by a linear actuator through a suitable lever and linkage system as desired. The actuator may be fluid of electrically driven, being responsive to actions of the various control systems previously described such as those of FIGS. 1–9.

The operation of the engine may be best described by a simple example comparing it with a conventional liquid engine with a constant throat area nozzle. In the latter case, throttleability is accomplished by control of the propellant feed system, such as by the regulating valve or equivalent means, the reduced mass flow rate reducing chamber pressure with a constant throat area and, hence, thrust. The maximum thrust is then limited by the maximum pumping capacity available, while the minimum thrust is limited by the effect of minimum pressure on combustion stability. For a typical case, the ratio of maximum to minimum pressure may be roughly 3 to 1, the thrust ratio differing from this slightly due to change in nozzle performance at the two chamber pressures.

With the variable throat area nozzle in FIG. 10, the chamber pressure may be varied by the propellant feed system in the same manner as in the constant throat area engine. In this case, however, the nozzle throat area also increases with increase in chamber pressure. For minimum thrust, the low chamber pressure acting on the differential cowl area causes only a small cowl extension, or minimum throat area, the product of the two providing minimum thrust. As chamber pressure is increased to its maximum value, the cowl pressure forces further compress the spring 57 (or its equivalent fluid spring 160), increasing throat area to maximum value, the product of the two now providing maximum thrust. The maximum to minimum thrust ratio is now the product of the maximum to minimum pressure ratio and the maximum to minimum throat area ratio neglecting differences in nozzle thrust coefficient as function of chamber pressure. If the same pressure ratio of 3 now results in, say, a fourfold increase in throat area, the thrust ratio for the variable area nozzle becomes approximately 12, instead of 3 with the constant area nozzle. The above numerical values are only illustrative, the actual maximum to minimum ratios for pressure and area being subject to specific detail designs.

It may be seen that, for a variable thrust engine, a relatively high spring rate would be desired for the spring 57 (or its equivalent fluid spring 160), for positioning the cowl in order to provide a substantial pressure change for the corresponding area change. This is in contrast to the system described for maintaining constant thrust for the solid propellant rocket engine under variable ambient temperatures as described previously.

For ballistic missile performance, a variable nozzle expansion ratio as a function of altitude may be provided as described hereinafter for solid propellant rocket engines. The regressive thrust-time characteristic of the solid propellant may be simulated in the liquid rocket installation of FIG. 10 by adapting the actuator, 330, to cause gradual closing of the regulating valve 324 as a function of time. This may be done by a constant-speed motor drive for the worm-gear 331, or any of a number of types of control, such as a cam and lever system to provide any desired valve opening, or mass flow rate, for thrust programming as a function of time. In this manner, the cowl will automatically retract as a function of the reduced flow rate, or reduced chamber pressure, making possible automatic variation of expansion ratio with altitude as a function of the common parameter, time.

The variable area nozzle also offers improved control over the starting transient, since ignition can be accomplished at the minimum thrust level in very large engines, with similar improvement during the shutdown transient.

Other means for varying the mass flow rate or chamber pressure may be employed. The speed of the turbo-pump assembly may be controlled, such as by a regulating valve and actuator, similar to 324 and 330, in the feed lines to the gas generator driving the turbo-pump (not shown); or by multiple injector cavities employing individual on-off valves to each cavity, thereby controlling the number of injector orifices in use. Equivalent means such as a variable orifice injector in the thrust chamber (not shown) may also be used as well as various combinations of the foregoing.

Obviously, manual control may be provided, such as in piloted aircraft, with a single throttle control operating the propellant feed system only, while the nozzle throat area is varied automatically, as described.

Further improvement in liquid propellant rocket engines may be gained with the plug nozzle in combination with systems employing gas pressurization in place of turbo-pump fed systems. Such rocket engines, sometimes referred to as liquid boosters, sometimes, use a small solid propellant charge as convenient means for pressurizing the liquid, the gaseous products of combustion generated by the solid propellant expelling the liquid from a tank into the thrust chamber. Therefore, and minimum The flow rate of the liquid propellant is dependent on the rate of gas generation of the solid propellant and, hence, the pressure, thrust and burning rate of the liquid booster experiences a variation as a result of the temperature sensitivity of the solid propellant charge. Therefore, the variable throat area of the plug nozzle will provide improvements, such as constant pressure and minimum thrust variation with a liquid booster similar to that already described for solid propellant rocket engines.

The plug nozzle will, as in the case of solid propellant booster rocket engines, also provide simplified thrust vector control, thereby eliminating large aerodynamic surfaces for stability which cause high aerodynamic drag and heavy structural loads requiring expensive attachment fittings. Also eliminated is the need for high precision nozzle thrust alignment; better performance is provided by reducing dispersion.

Figure 11:
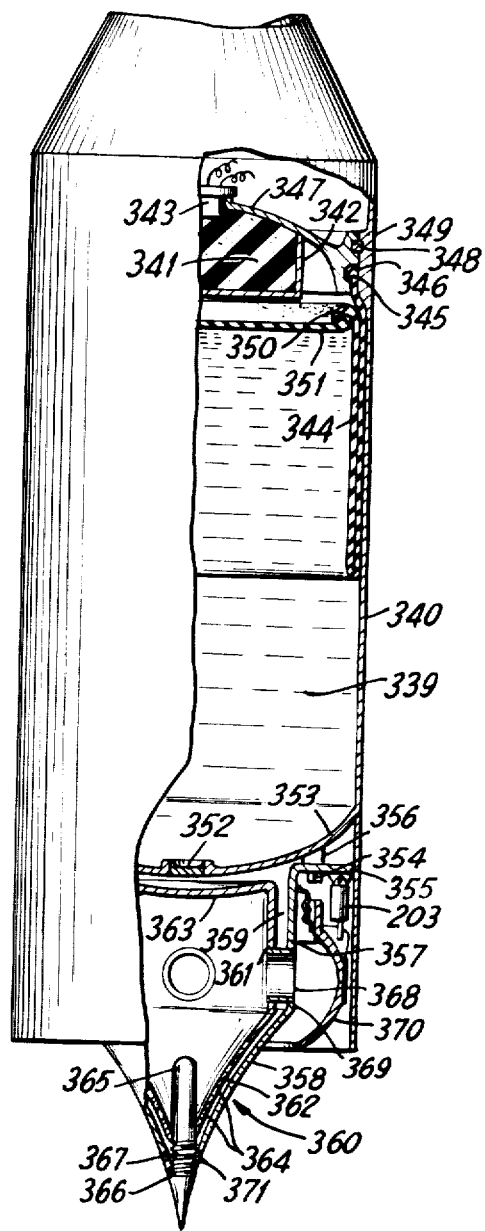
FIG. 11 is an elevational view, partially in section, of a liquid propellant rocket and its control system embodying an expellant bag and nozzle control structure.

A typical liquid propellant gas pressurized liquid booster rocket utilizing the plug nozzle is illustrated in FIG. 11. While the illustration is based on the use of the newer liquid monopropellants, its extension to a bipropellant system is straightforward. In the design shown, the thrust chamber including the plug surface is regeneratively cooled. For simplicity, the cowl is made of uncooled high temperature resistant refractory material such as used frequently in uncooled nozzles for solid propellant rocket engines. The cowl may also be liquid cooled if desired by suitable means (not shown) such as regenerative cooling by injection of additional propellant into the annular chamber enclosed by the cowl, or by film-cooling.

In FIG. 11, the monopropellant 339, stored within the pressure vessel or tank, 340, is pressurized by the solid propellant charge 341 within the container 342 when the igniter 343 is energized. An expellent bag, 344, separates the gaseous products of combustion generated by the solid propellant from the liquid propellant preventing chemical interaction, aeration of the liquid, and heat transfer between the hot gases and cool liquid, which have the effect of producing erratic pressures as the gases are cooled. The expellent bag is in the form of a sleeve seal, one end of which has a bead, 345, which engages a groove, 346, in the head closure, 347. The latter is structurally attached by the key, 348, to the flange, 349, of the tank, 340. The bead 345 then forms a seal, similar to an O-ring seal, between the head closure and tank, and also retains the sleeve within the tank. The opposite end of the sleeve, which folds back on itself, is permanently bonded at 350 to the flexible diaphragm 351. A burst disc, 352, at the lowest portion of the aft head closure 353 of the tank 340 seals the liquid propellant within the tank 340.

The thrust chamber assembly, 360, is fabricated as a separate sub-assembly to facilitate production and attached to the aft head 353 of tank 340 by bolts, 354, through the flange, 355, mating with the boss, 356, on the head, 353, although a welded connection may be optional. The thrust chamber assembly comprises an outer cylinder 357 to which is attached a plug surface, 358, forming an annular gap, 359, with respect to an inner cylinder 361 and an attached inner plug surface 362, the gap thus formed providing a coolant passage for the regeneratively cooled thrust chamber. A thrust chamber head closure, 363, completes the coolant passage by providing a gap in relation to the tank aft closure 353.

The injector comprises simple orifices, 364, through the inner plug surface near the apex of the inner plug, the emerging jet impinging on the igniter rod, 365, which is inserted through the opening, 366, in the outer plug surface, 358, and retained therein such as by the thread, 367. Small bleed holes, 371, may be provided through the outer plug surface, 358, near the apex to provide local film cooling of the plug tip as required.

The igniter surface is coated with a catalytic material, such as lithium or its compounds, which reacts with the incoming monopropellant to cause hypergolic ignition.

Radial ports, 368, are provided through the inner and outer cylinder walls of the thrust chamber by the collar, 369, for passage of combustion products radially outward into the annular volume enclosed by the cowl, 370, in the manner previously described. The cowl, 370, is flexibly mounted to the cylinder, 357, such as by a bellows, or flexible seal, illustrated and described in greater detail hereinbefore. Means for positioning the cowl, such as mechanical or fluid springs, or actuators such as 203, including means for thrust vector control, may also be as previously described. The various controls for variable thrust may also be used, with the knowledge that there will be a greater time lag due to the large volume of stored gas as burning time progresses.

Means for thrust termination may be provided as part of the cowl assembly, as previously described, since burst discs provide no means for terminating propellant flow. A control valve may replace the burst disc when thrust termination is required, although burst discs may provide greater reliability and freedom from leakage during prolonged storage.

In operation, when the igniter, 343, is energized, the solid propellant charge generates gas pressure which acts on the diaphragm, 351, causing the expellent bag to extend downwardly toward the tank aft head, 353. Upon pressurization, the burst disc 352 fails, permitting propellant to enter the coolant passage 359 whence it is injected into the thrust chamber through orifices, 364, striking the igniter, 365, thereby producing positive ignition. After ignition is initiated, combustion may continue by the presence of hot gases within the chamber, with no further need for the igniter.

As the propellant level reduces near the end of burning, the flexible diaphragm 351 will deflect to conform to the shape of the aft head closure 353 thereby assuring maximum volumetric efficiency approaching 100 percent displacement of stored propellant. Since certain monopropellants have, in general, the properties of Nitric Acid, the sleeve and diaphragm of the expellent bag may preferably be made of acid resistant plastic materials, such as the newer fluorelastomers, which exhibit good chemical resistance, and good mechanical properties over a wide temperature range.

Figure 12:
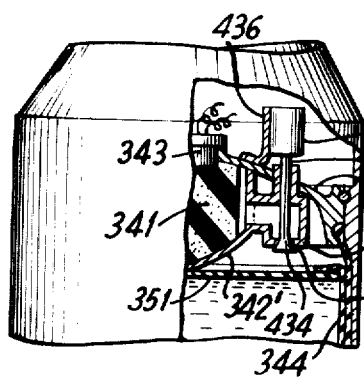
FIG. 12 is a fragmentary elevational view, partially in section, illustrating a modification to the system of FIG. 11.

An alternate means for gas pressurization of liquid propellant rocket engines is shown in FIG. 12, in which the simple container 342 of FIG. 11 is replaced by a pressure vessel, 342', having a controllable variable area discharge orifice at 431. The assembly including the pressure vessel 342', solid propellant charge 341, variable area orifice 431 becomes a gas generator capable of having a variable and controllable mass flow rate.

Following ignition of the solid propellant by energizing the igniter 343 electrically, the internal pressure within the pressure vessel 342' is controlled independently of the pressure which may exist at any time in the tank 340 by controlling the discharge orifice area, 431. The latter is controlled by the actuator 432, supported by bracket 436, by means of the rod, 433, which varies the position of the valve, 434, relative to the seat, 435. As the orifice area is varied, gas generator pressure varies, and through the dependence of propellant burning rate on pressure, the gas mass flow rate varies. This, in turn, varies the mass flow rate of the liquid propellant providing variable thrust. In this arrangement, simple mechanical or fluid springs may be used to position the cowl, 370, of the thrust chamber assembly, 360, of FIG. 11, the variable thrust being controlled by the solid propellant gas generator with variable mass flow rate.

The actuator, 432, controlling the rate of gas generation, may also be driven by a timing device, similar to that described for the actuator, 330, in the turbo-pump fed system of FIG. 10; the gas pressurized liquid booster rocket engine may then also have the regressive thrust-time characteristic similar to the turbo-pump system, and analogous to regressive burning solid propellant rocket engines described previously and in further detail hereinafter. Either of the three systems may then be used for various missile applications such as those hereinafter described.

The variable mass flow gas generator may also automatically compensate for variation in internal ballistics of the liquid propellant as function of ambient temperature and other variables as previously described for solid propellant rockets.

Thus, it may be seen that new concepts in thrust chamber design, variable mass flow gas generators, simplified injector, expellent bag, general assembly and manufacture, make possible improved performance for liquid propellant booster rocket engines.

For applications to multiple stage rocket engines particularly long range ballistic missiles, reference is directed to applicant's codivisional application, Ser. No. 784,818 for Solid Propellant Rocket Engine Control And Missile Configurations, hereinbefore cited;

What is claimed is:

1. A missile system comprising a missile structure having
    a store of propellant,
    a thrust-producing engine for propelling said missile, said engine having
        a variable controllable cowl-plug structure configured and arranged to affect the throat-area geometry of the engine exhaust structure in a manner to effect continuous control over the thrust producing exhaust therefrom for missile control,
        actuator means coupled to said engine for regulating the configuration of said cowl-plug structure,
    and control means operatively coupled to said actuator means for controlling missile flight, said control means including
        transducer means for sensing a missile flight parameter to be controlled,
        reference means for establishing a reference signal corresponding to the desired condition of said parameter,
        comparator means responsive to said reference means and transducer means, and operatively coupled to said actuator means for varying the configuration of said engine cowl-plug structure as a function of the relation between said sensed missile flight parameter and said desired reference parameter condition.

2. A missile system as defined in claim 1, in which said actuator means include means for varying the configuration of said cowl-plug structure to control the stream direction of said thrust producing engine exhaust to thereby vary the attitude of said missile, and said transducer means include means for sensing missile attitude.

3. A missile system as defined in claim 2 in which said reference means include means for supplying a variable command attitude signal to said comparator means.

4. A missile as defined in claim 2 in which said reference means include means for establishing a reference missile attitude signal for said comparator means.

5. A missile system as defined in claim 1 in which said transducer means comprises means for sensing the operative pressure within said engine and force producing means operatively coupled to said pressure sensing means for controlling the configuration of said cowl-plug structure as a function of said engine pressure.

6. A missile system as defined in claim 1 in which said comparator means comprise signal switching means.

7. A missile system as defined in claim 6 in which said signal switching means comprise electrical switch means.

8. A missile system as defined in claim 6 in which said signal switching means comprise fluid pressure switching means.

9. A missile system as defined in claim 1 in which said transducer means and reference means comprise fluid pressure translating means.

10. A missile system as defined in claim 1 in which said reference means comprise fluid pressure responsive translating means and controllable pressurization means coupled to said translating means for supplying fluid to said translating means at a pressure corresponding to the desired condition for said parameter.

11. A missile system as defined in claim 1 in which said actuator means include means for varying the angular relationship between said cowl and plug.

12. A missile system as defined in claim 1 in which said actuator means include means for varying the longitudinal relationship between said cowl and plug.

13. A missile system as defined in claim 1 in which said actuator means include means for varying the longitudinal relationship and angular relationship between said cowl and plug.

14. A missile system comprising a missile structure having
    a store of propellant,
    a thrust-producing engine for propelling said missile, said engine having
        a variable controllable cowl-plug structure configured and arranged to affect the throat-area geometry of the engine exhaust structure in a manner to effect continuous control over the thrust producing exhaust therefrom for missile control,
    actuator means coupled to said engine for regulating the configuration of said cowl-plug structure,
    and control means operatively coupled to said actuator means for controlling missile flight, said control means including
        transducer means for sensing a missile flight parameter to be controlled,
        reference means for establishing a reference signal corresponding to the desired condition of said parameter,
        comparator means responsive to said reference means and transducer means, and operatively coupled to said actuator means for varying the configuration of said engine cowl-plug structure as a function of the relation between said sensed missile flight parameter and said desired reference parameter condition, said transducer means including means for sensing the course angle of said missile in flight and generating a variable signal in response to said course angle and said control means including computer means operatively associated with said reference means for converting said course angle signal into a missile attitude control signal.

15. A missile system comprising a missile structure having a store of propellant, a thrust-producing engine for propelling said missile, said engine having a variable controllable cowl-plug structure configured and arranged to affect the throat-area geometry of the engine exhaust structure in a manner to effect continuous control over the thrust producing exhaust therefrom for missile control, actuator means coupled to said engine for regulating the configuration of said cowl-plug structure, and control means operatively coupled to said actuator means for controlling missile flight, said control means including transducer means for sensing a missile flight parameter to be controlled, reference means for establishing a reference signal corresponding to the desired condition of said parameter, comparator means responsive to said reference means and transducer means, and operatively coupled to said actuator means for varying the configuration of said engine cowl-plug structure as a function of the relation between said sensed missile flight parameter and said desired reference parameter condition, said transducer means comprising means for sensing missile acceleration to control same.

16. A missile system as defined in claim 15 in which said reference means include means for supplying said comparator means with a signal corresponding to desired missile acceleration.

17. A missile system as defined in claim 16 in which said control means include timing means for regulating the period of said acceleration.

18. A missile system as defined in claim 1 in which said transducer means comprise spring-mass means.

19. A missile system as defined in claim 1 in which said transducer means comprise means for sensing missile velocity to control same.

20. A missile system as defined in claim 19 in which said reference means comprise means for supplying said comparator means with a signal corresponding to desired missile velocity.

21. A missile system as defined in claim 1 in which said reference means comprise programmed means for varying said desired conditions.

22. A missile system as defined in claim 1 in which said transducer means include missile acceleration sensing means and missile velocity sensing means.

23. A missile system comprising a missile structure having a store of propellant, a thrust-producing engine for propelling said missile, said engine having a variable controllable cowl-plug structure configured and arranged to affect the throat-area geometry of the engine exhaust structure in a manner to effect continuous control over the thrust producing exhaust therefrom for missile control, actuator means coupled to said engine for regulating the configuration of said cowl-plug structure, and control means operatively coupled to said actuator means for controlling missile flight, said control means including transducer means for sensing a missile flight parameter to be controlled, reference means for establishing a reference signal corresponding to the desired condition of said parameter, comparator means responsive to said reference means and transducer means, and operatively coupled to said actuator means for varying the configuration of said engine cowl-plug structure as a function of the relation between said sensed missile flight parameter and said desired reference parameter condition, said transducer means including missile acceleration sensing means and missile velocity sensing means and said control means including means for selectively connecting either said acceleration sensing means or said velocity sensing means into said control means.

24. A missile system comprising a missile structure having a store of propellant, a thrust-producing engine for propelling said missile, said engine having a variable controllable cowl-plug structure configured and arranged to affect the throat-area geometry of the engine exhaust structure in a manner to effect continuous control over the thrust producing exhaust therefrom for missile control, actuator means coupled to said engine for regulating the configuration of said cowl-plug structure, and control means operatively coupled to said actuator means for controlling missile flight, said control means including transducer means for sensing a missile flight parameter to be controlled, reference means for establishing a reference signal corresponding to the desired condition of said parameter, comparator means responsive to said reference means and transducer means, and operatively coupled to said actuator means for varying the configuration of said engine cowl-plug structure as a function of the relation between said sensed missile flight parameter and said desired reference parameter condition, said control means further including means for establishing a non-propulsive storage condition for said system.

25. A missile system as defined in claim 24 in which said non-propulsive storage means include means for adjusting said reference means to a state producing a non-propulsive configuration of said cowl-plug structure.

26. A missile system as defined in claim 24 in which said non-propulsive storage means comprise means for rendering said actuator means inoperative to regulate said cowl-plug structure and wherein said cowl-plug structure normally independently assumes a non-propulsive configuration in response to internal engine pressure whereby accidental ignition drives said cowl-plug configuration to said non-propulsive configuration.

27. A missile system comprising
a missile structure having
   a store of propellant,
a thrust producing reaction engine in operative communication with said propellant store, said engine having
   means for controllably varying the thrust produced thereby,
sensor means for monitoring kinematic parameters of linear motion of said missile structure during flight,
and control means operatively connected between said sensor means and said thrust varying means to control the flight kinematics of said missile.

28. A missile system as defined in claim 27 in which said sensor means comprise means for monitoring missile velocity.

29. A missile system as defined in claim 27 in which said sensor means comprise means for monitoring missile acceleration.

30. A missile system as defined in claim 27 in which said control means comprise differential fluid valve means responsively coupled to said sensor means and hydraulic actuator means responsively coupled to said valve means.

31. A missile system as defined in claim 27 in which said control means comprise differential switch means responsively coupled to said sensor means and a bi-directional electrical actuator responsively coupled to said switch means.

* * * * *